Sept. 19, 1961  L. A. IDDINGS  3,000,255
SCANNING DEVICES FOR OPTICAL SEARCH
Filed May 31, 1955  2 Sheets-Sheet 1

INVENTOR.
LLOYD A IDDINGS
BY
ATTYS.

Sept. 19, 1961 L. A. IDDINGS 3,000,255
SCANNING DEVICES FOR OPTICAL SEARCH
Filed May 31, 1955 2 Sheets-Sheet 2

INVENTOR.
LLOYD A. IDDINGS
BY
ATTYS.

United States Patent Office 3,000,255
Patented Sept. 19, 1961

3,000,255
SCANNING DEVICES FOR OPTICAL SEARCH
Lloyd A. Iddings, 5207 11th Road S., Arlington, Va.
Filed May 31, 1955, Ser. No. 512,344
12 Claims. (Cl. 88—1)
(Granted under Title 35, U.S. Code (1952), sec. 266)

The invention described herein may be manufactured and used by or for the Government of the United States of America for governmental purposes without the payment of any royalties thereon or therefor.

This invention relates to a scanning device for optical research systems and more particularly to a pair of driven slitted plates in a collimated search beam for providing a spiral scan throughout the beam from which polar coordinate signals of a target point source of light in the beam may be obtained for gun fire control information.

Several well known means and methods of obtaining the position of a point source of light in a beam have been used. In one system the field of view of the optical search system is reduced to a very small angle and the whole optical system is pointed toward the target. This has the disadvantage that optical systems are usually bulky and too heavy for fast movement. Another method is by inserting a single scanning disc in front of the detector of the optical system. This method modifies the signal received on the detector from the point source of light and, by means of electronic descrambling devices, the position of the point source of light is determined from the detector signals. The disadvantage of this system is that the electronic descrambling circuits are extremely complicated and require complicated instrumentation.

In the present invention a pair of scanning discs, one having a radial transparent line or slit and the other having a one-turn spiral transparent line or slit, are rotated in unison in a collimated beam of light from an optical search system. One scanning disc has a slightly greater rotative speed than the other scanning disc to produce a locus of points providing a spiral scan throughout the collimated beam. The polar coordinates of any target appearing in the collimated beam can be determined from the angular relation of the scanning discs, this relation being at all times known from voltage signals of rotatable potentiometers coupled to each scanning disc. A point source of light in the collimated beam represents a target which falls upon a detector when the scanning discs are in one angular position thereby providing the signal for angular relation reading of the scanning discs. Once the polar coordinates are determined, this information may be passed on to a gun fire control system to dispose of the target. It is therefore a general object of this invention to collimate a light beam collected from a target area and to scan the collimated beam without deteriorating from a target point source of light to provide polar coordinate information of the target from position data in the collimated beam.

These and other objects, advantages, features, and uses will become more apparent as the description proceeds when taken in consideration with the accompanying drawings in which.

Figure 1:
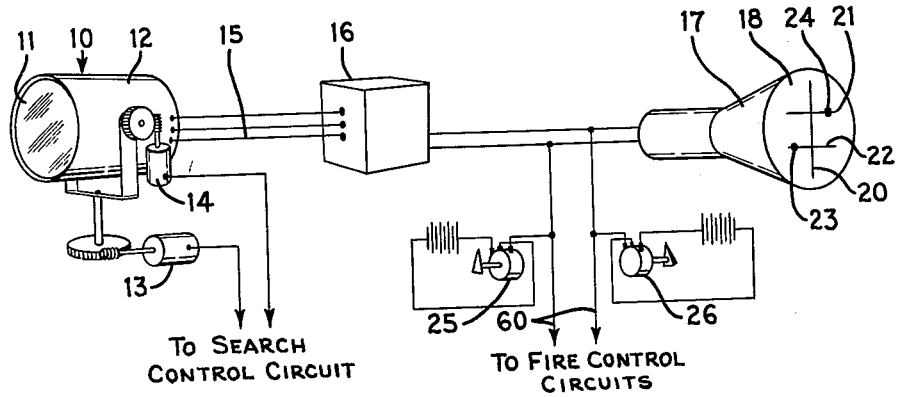
FIG. 1 is a schematic diagram shown partly in block of the environment of the invention.
Figure 2A:
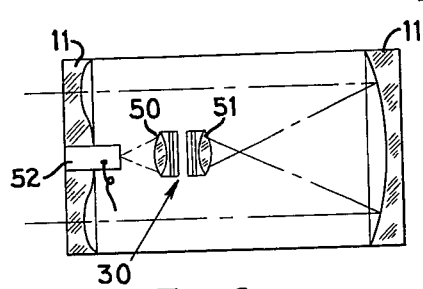
FIG. 2 shows several modifications of the optical system in the environment of the invention.
Figure 2B:
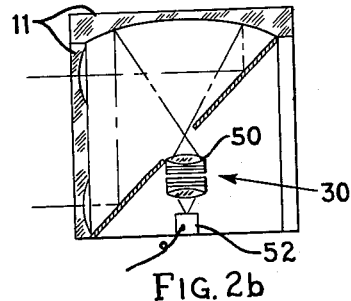
Figure 2C:
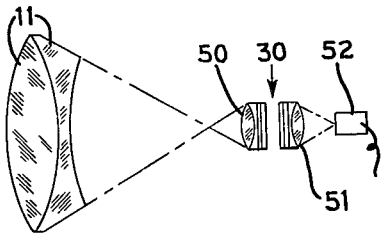
Figure 2D:
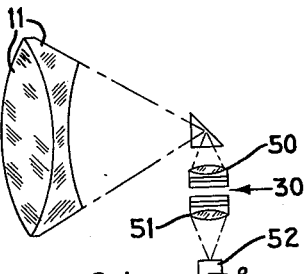

Referring more particularly to FIG. 1 wherein the environment of the novel scanning device is shown schematically, a search head assembly, represented generally by the reference character 10, has its optical system 11 supported in a framework or cage 12 which is rotatable in the azimuth direction under the control of a motor 13 and in the elevational direction by the motor 14, as is well understood in the art. The control motors 13 and 14 have their circuits coupled to a search control circuit (not shown), as is well understood in the art. The outputs from a scanning device, as will presently be described hereinbelow, are coupled by conductors 15 to the deflection and grid networks of an electronic circuit, represented in block by the reference character 16, for driving a cathode ray tube 17. The electronic circuit 16 and cathode ray tube 17 are operated in the usual and well known manner for producing traces on the fluorescent screen 18 of the cathode ray tube 17. As will hereinafter be made clear, the output via conductors 15 from the novel scanning device of this invention produces traces on the fluorescent screen 18 of the cathode ray tube 17, the vertical trace 20 indicating the center of the optical system in the search unit 10 and the horizontal traces 21 and 22 each representing one of the scanning discs of the novel scanning device soon to be described. Target pips 23 and 24 result from the output of the novel scanning device in the grid circuit of cathode ray tube 17. Each target pip is under the bias control of potentiometers 25 and 26 which are manually operated to bias the target pip toward or away from the vertical line 20, the potentiometer 25 being capable of controlling the target pip 23 and the potentiometer 26 being capable of controlling the target pip 24.

Referring to FIG. 2, there are illustrated four different modifications in a, b, c, and d of the optical system 11 used in the search unit 10. Each optical unit includes the novel scanning device of this invention illustrated generally in these figures by the reference character 30. Each scanning system 30 includes a collimating lens system 50 and a convergent lens system 51 directing the light beam to a detector 52, as will be more particularly disclosed with reference to FIG. 4, although the collimating and convergent lens systems may be supported in the framework 12, if desired.

Figure 3:
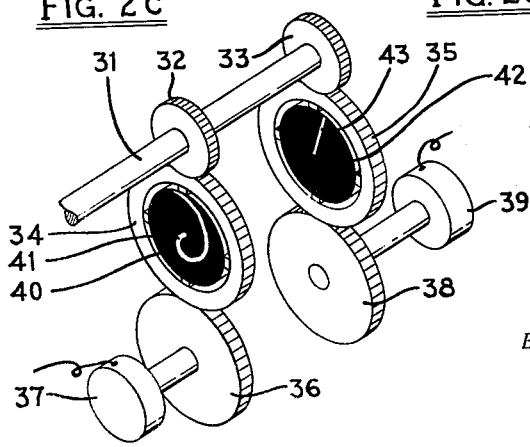
FIGS. 3 and 4 illustrate the scanning device of the invention in perspective and cross-section, respectively.
Figure 4:
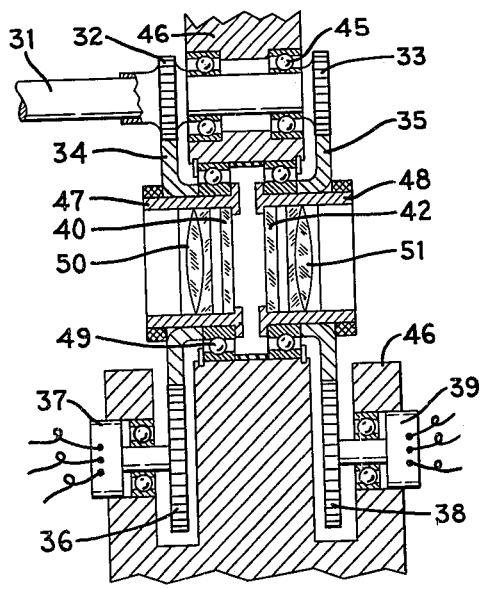

Referring now more particularly to FIGS. 3 and 4, a scan drive shaft 31 is driven by a motor means (not shown) to drive two scan drive gears or gear clusters 32 and 33, each of which meshes with a disc drive gear 34 and 35, respectively. The scan drive gears 32 and 33 and 35, respectively. The scan drive gears 32 and 33 are of equal size having an equal number of teeth; while the disc drive gears 34 and 35 have an unequal number of teeth but are of a size to maintain the centers thereof aligned. The tooth profile of the scan drive gears 32 and 33 may be corrected sufficiently to maintain the centers of the disc drive gears 34 and 35 on a common axis. For the purpose of example, let it be assumed in illustrating this invention that the disc drive gear 34 has twenty-five teeth and that the disc drive gear 35 has twenty-four teeth, the purpose of which will become clear as the description proceeds. In mesh with the disc drive gear 34 is a potentiometer drive gear 36 which drives the adjustable tap of a rotatable potentiometer 37. The potentiometer drive gear 36 must have the same number of teeth thereon as the disc drive gear 34, or twenty-five teeth in accordance with the above example. In mesh with the disc drive gear 35 is a potentiometer drive gear 38 which drives the adjustable tap of a rotatable potentiometer 39. The potentiometer drive gear 38 must have the same number of teeth as the disc drive gear 35, or twenty-four teeth in accordance with the example. Each disc drive gear supports a scanning disc element, the disc drive gear 34 supporting a scanning disc 40 which is opaque to the transmittance of light with the exception of a one-turn transparent spiral line 41, and the disc drive gear 35 supporting an opaque scanning disc 42 having a transparent radial line 43 therein. It may be understood at this point that upon the rotation of the scan drive shaft 31 the two disc drive gears 34 and 35 will be driven, but at different speeds. Since the number of teeth in the disc drive gear 34 is greater by one than the number of teeth in the disc drive gear 35 and the disc drive gear 34 has twenty-five teeth, it will require twenty-four revolutions of the disc drive gear 34 to make one relative revolution between the disc drive gears 34 and 35. It may, therefore, be understood that upon twenty-five revolutions of the disc drive gear 35 the locus of points of a ray of light passing parallel to the optical center through the scanning discs 40 and 42 at the point of intersection of the transparent lines 41 and 43, respectively, will produce a spiral scan of twenty-five turns from the optical center to the peripheral edge of the scanning disc. The operation and results of this mechanism will become clear as the description proceeds with reference to other figures.

Referring more particularly to FIG. 4 for a more practical construction of the scanning device the scan drive shaft 31 is journaled by friction-type bearings 45 in a housing member 46 fixed within the scanning head 10. Each disc drive gear 34 and 35 is fixed on a tubular member 47 and 48, respectively, both of which are journaled by friction-type bearings 49 in the housing member 46. The tubular member 47 supports the collimating lens system 50 for receiving a beam from the optical system 11 to produce a beam of parallel rays attempting to cross the scanning discs 40 and 42 to the convergent lens system 51, the convergent lens system 51 being supported in the tubular member 48. Upon the rotation of the disc drive gears 34 and 35 the collimating lens system 50 will rotate with the scanning disc 40 and the convergent lens system 51 will rotate with the scanning disc 42.

Figure 5:
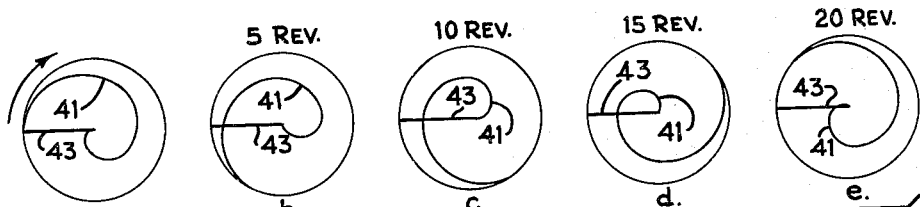
FIG. 5 illustrates a plurality of positions of the scanning device.

Referring now to FIG. 5 there is shown five different positions of the scanning discs 40 and 42 to illustrate the locus of points traced by the intersection of the transparent lines 41 and 43 thereof. As shown in FIG. 5a the intersection of the lines 41 and 43 is at the outer periphery herein illustrated as the starting point of the scanning discs. With the discs revolving in the direction of the arrow shown, the locus of points will have travelled to the point shown by the intersection of transparent lines 41 and 43 in FIG. 5b after five revolutions of the scanning disc 42. The remaining FIGURES 5c, 5d, and 5e each illustrate the point of intersection as it has advanced toward the optical center after ten revolutions, fifteen revolutions, and twenty revolutions, respectively. After twenty-five revolutions of the scanning disc 42, and consequently twenty-four revolutions of the scanning disc 40, the transparent lines 41 and 43 will again be at the starting point as illustrated in FIG. 5a.

Figure 6:
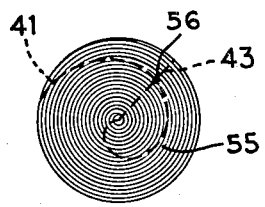
FIG. 6 illustrates the spiral scan of the novel scanning device with a target position illustrated therein.

The locus of points produced by twenty-five revolutions of the scanning disc 42 will produce a spiral scan of twenty-five turns as illustrated by line 55 in FIG. 6. For any one position of a target illustrated, as at 56, there will be only one relative angular position of the scanning discs 40 and 42 to provide an intersection point between transparent lines 41 and 43, each illustrated in broken lines in FIG. 6.

In the operation of the device the search head 10 is driven to search the sky area and when a target appears the search system 10 will fix on that target. A beam of light from the target area will be transmitted through the optical system 11 and through the collimating lens system 50 in an attempt to transmit the full beam through the convergent lens system to the detector 52. The scanning discs 40 and 42 prevent the transmittance of the beam except for a ray passing through the intersection of the transparent lines 41 and 43. When the scan produced by the intersection of the transparent lines 41 and 43 encounter the bright ray produced by the target, the detector 52 will be energized to produce the pips 23 and 24 on the lines 21 and 22 of the fluorescent screen 18 of the cathode ray tube 17. The pips 23 and 24 will be off from the centerline 20 in correspondence with the angular relation of the scanning discs 40 and 42. By adjusting the potentiometer 25 and 26 to bias the pips 23 and 24 to the centerline 20, a voltage signal will be produced by each potentiometer in direct correspondence to the angular relation of the corresponding scanning disc, these signals providing the polar coordinates of the target 56 in the collimated beam being transmitted by the optical system 11. These polar coordinate signals are directed to the fire control circuits by the conductors 60 for operation by the gun fire control system (not shown) to dispose of the target. This provides a manual means by operation of the potentiometers 25 and 26 to produce polar coordinate signals for the gun fire control system.

Figure 7:
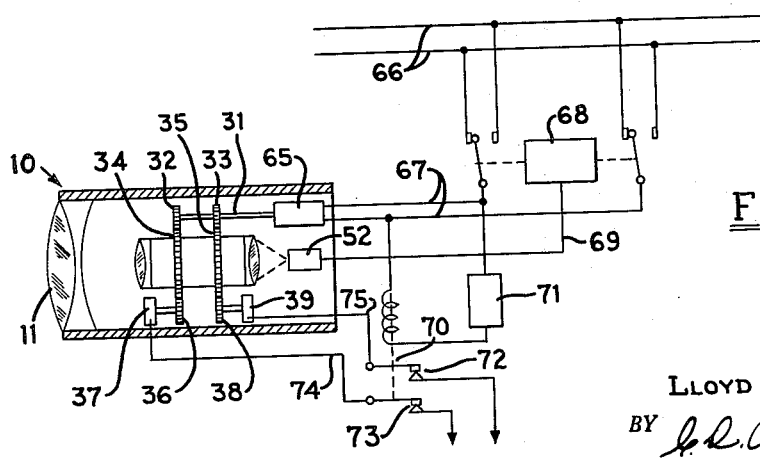
FIG. 7 illustrates a modification of the scanning system to adapt it for automatic operation.

The system may be adapted for the automatic transmission of polar coordinate signals to a gun fire control system as illustrated in the modification shown in FIG. 7. The scan drive shaft 31 is driven by a motor 65, which motor is energized from a D.C. source 66 through conductors 67. In the conductor circuit 67 is a double pole, double throw relay switch generally referred to by the reference character 68, which relay switch is of the type to switch the poles upon every new energization thereof. The relay switch 68 has its energization component connected to the detector 52 by conductor 69. A relay switch 70 has its energization component coupled across the supply lines 67 of the motor 65 and includes a delay circuit 71 therein for delaying the operation of this relay for a short time interval after de-energization. The relay 70 controls normally closed contacts 72 and 73 in the conductors 74 and 75 from the potentiometers 37 and 39, respectively. The conductors 74 and 75 conduct voltage signals from the corresponding potentiometers to the fire control circuits of the gun fire control system (not shown).

In the operation of the device shown in FIG. 7, whenever a target appears in the collimated beam of light the detector 52 will energize the relay 68 to throw the switches controlled thereby to reverse the direction of the motor 65. Upon the reversal of the motor 65 the scan discs 40 and 42 will again encounter the target at which time the detector 52 will switch the relay 68 again reversing the rotation of motor 65. This procedure continues in damped oscillations until the motor 65 becomes stopped on the target at which time the relay contacts are substantially vibrating between their two positions. During the scanning operation the motor 65 is energized the greater part of the time causing energization of the relay 70 breaking the circuits via conductors 74 and 75 by the contacts 72 and 73. When the motor 65 comes to a substantial standstill the relay 70 will become de-energized after the delay period fixed by the circuit 71 to establish the circuits in the conductors 74 and 75. Potentiometers 37 and 39 thereby provide voltage signals corresponding to the polar coordinates of the target with respect to the optical center through the collimated beam across the scanning disc 40 and 42.

While many modifications and changes may be made in the structural details and features of this invention in which I have shown and described two modifications of the preferred form by way of illustration only, I desire to be limited in my invention only by the scope of the appended claims.

I claim:

1. A scanning system in a target search system comprising; a search system including an optical system producing a collimated search beam; a scanning device in said collimated search beam, said scanning device having a pair of opaque discs, one having a radial transparent line therein and the other having a one-turn spiral transparent line therein and said discs being driven at different rotative speeds in the same direction for providing a spiral scan of said collimated search beam; an angular position information means driven by each disc for providing the angular displacement of each said disc and the corresponding transparent line at any time; a detector for detecting a target signal in said collimated beam by coincidence of said radial and spiral transparent lines with the beam carrying said target signal through which said target signal is transmitted; means coordinating the angular displacement information from said angular position information means for each disc and said detector signals to provide coordinate information of the target signal in the collimated search beam; and means making manifest said coordinate information whereby the target producing a target signal may be located accurately in the area searched.

2. A scanning system as set forth in claim 1 wherein said angular position information means consists of a rotatable potentiometer having the rotatable contact thereof driven by said disc, the voltage level corresponding to the angular position of said disc, and the relative voltage level of both potentiometers at the instant said detector detects a target signal providing the coordinate position of the target in the scanned field.

3. A scanning system as set forth in claim 2 wherein said scanning discs are each supported in a cage within a disc drive gear, the disc drive gear supporting one of said discs having a greater number of teeth than the disc drive gear supporting the other of said discs, the disc drive gears being driven by a common drive gear, and a potentiometer drive gear meshing with each disc drive gear and having an equal number of teeth as the meshing disc drive gear.

4. A scanning system as set forth in claim 1 wherein said angular position information consists of variable voltage signals and said means for coordinating the information from said angular position information and said detector signals is a manually controlled means in which said variable voltage signals may be exactly nulled by bias voltages providing the coordinate information.

5. A scanning system as set forth in caim 1 wherein said angular position information consists of variable voltage signals and said means for coordinating the variable voltage signals and said detector signals is a relay system for causing the drive of said pair of opaque discs to hunt to the target signal position and to maintain the output circuits of said variable voltage signals broken until a target signal appears at said detector.

6. A scanning system in a target search system comprising; a search system including an optical system producing a collimated search beam; a scanning device in said collimated search beam, said scanning device having a pair of opaque discs, one having a radial transparent line therein and the other having a one-turn spiral transparent line therein and said discs being driven at different rotative speeds in the same direction for providing a spiral scan of said collimated search beam; a detector for detecting a target signal in said collimated beam by said scanning device; voltage signal means coupled to each of said pair of discs for providing a voltage signal corresponding to the angular position of said discs; indicating means coupled to said detector and to said voltage signal means; and means associated with said indicating means for transmitting output signals of the target position with respect to the optical center of said search system.

7. In a scanning device comprising; a pair of opaque circular discs driven at different speeds in a collimated beam from a search system, one disc having a radial transparent opening and the other having a one-turn spiral transparent opening, for transmitting light therethrough at the intersection of said radial and spiral openings; a light sensitive detector in said collimated beam for receiving light rays passing through said intersection; and signal means driven in direct relation with each disc whereby the position of a bright ray in the collimated beam can be determined from said signal means and said light sensitive detector.

8. In a search system having a collimated search beam a scanning device comprising; a pair of opaque circular discs driven at different speeds in the collimated search beam, one disc having a radial transparent line therein and the other disc having a one-turn spiral transparent line therein for transmitting a light ray therethrough at the intersection of said lines; variable voltage signal means driven by each of said pair of discs for producing voltage signals in a direct relation to the angular position of the corresponding disc; and a light sensitive detector in a position relative to said pair of discs for receiving light rays passing through said discs for producing a signal upon detecting a target signal in said light rays whereby target position may be determined simultaneously from said voltage signals and said detector signal.

9. A scanning device as set forth in claim 8 wherein said pair of opaque circular discs are driven at different speeds by gear means, said gear means including a common driving gear in mesh with a disc drive gear supporting each circular disc, one disc drive gear having a greater number of teeth thereon than the other disc drive gear whereby rotation of said common driving gear produces relative rotation of said circular discs.

10. A scanning device as set forth in claim 9 wherein said variable signal means driven by each of said pair of discs each consists of a potentiometer having the adjustable tap thereof driven by a potentiometer gear in mesh with the corresponding disc drive gear, each potentiometer gear having an equal number of teeth as the meshing disc drive gear.

11. A scanning device in a target search optical system comprising; a pair of tubular supports journaled in an optical search head; a disc drive gear on each tubular support in mesh with a common drive gear, one disc drive gear having a greater number of teeth than the other disc drive gear; a collimating lens system and a first opaque scanning disc supported in one tubular support through which the scanned light enters and a second opaque scanning disc and a convergent lens system supported in the other tubular support, in that order, one scanning disc having a radial transparent line therein and the other having a spiral transparent line therein for permitting a ray of light from the collimated beam to pass throughout the spiral transparent path established by the locus of points produced by the intersection of said transparent lines; a rotatable potentiometer driven by each disc drive gear in correspondence with the angular relation of the corresponding scanning disc for producing voltage signals proportional to said corresponding scanning disc; and light sensitive means positioned to receive the light ray passing through the intersection of said transparent lines of said scanning discs and said convergent lens system for producing a signal upon the appearance of a target signal in said light rays whereby the coordinate position of a target signal is determined from said potentiometer voltage signals.

12. In a search system having a collimated search beam therein, a scanning device comprising; a pair of tubular supports journaled in the search head of a search system for receiving a collimated search beam therethrough, each tubular support having a disc drive gear thereon in mesh with a common driving gear, one disc drive gear having more teeth than the other disc drive gear; an opaque scanning disc supported perpendicular to the longitudinal axis in each tubular support, one scanning disc having a radial transparent line and the other scanning disc having a one-turn spiral originating at the optical center and connecting the periphery thereof to produce a spiral scan of said collimated beam by passing light rays of said collimated beam through the intersection of said transparent lines; a light sensitive detector positioned to receive said light rays for producing a signal upon the appearance of a target signal in said light rays; a rotatable potentiometer driven by a potentiometer gear in mesh with each disc drive gear, each potentiometer gear having the same number of teeth as the meshing disc drive gear for producing voltage signals in direct correspondence with the angular relation of said corresponding scanning disc whereby the coordinate position of a target signal in said search beam can be determined from said voltage signals at the instant of appearance of a detector target signal.

References Cited in the file of this patent

UNITED STATES PATENTS

| | | |
|---|---|---|
| 2,401,697 | MacNeille | June 4, 1946 |
| 2,549,030 | Stewart | Apr. 17, 1951 |
| 2,565,745 | Skalka | Aug. 28, 1951 |
| 2,604,528 | Obermaier | July 22, 1952 |

FOREIGN PATENTS

| | | |
|---|---|---|
| 718,361 | Germany | Mar. 10, 1942 |